United States Patent

[11] 3,587,518

| [72] | Inventor | Frederic Hauptman<br>Rego Park, N.Y. |
|---|---|---|
| [21] | Appl. No. | 873,190 |
| [22] | Filed | Nov. 3, 1969 |
| [45] | Patented | June 28, 1971 |
| [73] | Assignee | Kollsman Instrument Corporation<br>Syosset, N.Y. |

[54] SENSITIVE METRIC ALTIMETER
6 Claims, 1 Drawing Fig.

[52] U.S. Cl. .................................................. 116/129F,
116/129R
[51] Int. Cl. ........................................................ G01d 13/02
[50] Field of Search .......................................... 116/129
(N.E.), 129 (A,F,H,K), 129 (F, R, E, N)

[56] References Cited
UNITED STATES PATENTS
2,123,395  7/1938  Antrim .......................... 116/129(A)X

| 2,561,332 | 7/1951 | Beach et al .................. | 116/129 |
|---|---|---|---|
| 2,689,480 | 9/1954 | Angst ........................... | 73/387 |
| 2,832,220 | 4/1958 | Logie ........................... | 116/129X |

FOREIGN PATENTS
939,752  10/1963  Australia ..................... 116/129(NA)

Primary Examiner—Louis R. Prince
Assistant Examiner—Daniel M. Yasich
Attorneys—E. Manning Giles, J. Patrick Cagney and Peter S. Lucyshyn ABSTRACT: A readout display for altimeters having a rotatable output indicator shaft includes a digital scale concentric of the shaft and extending approximately 180° radially thereabout. An indicator pointer having a pair of oppositely directed hands is mounted on the shaft for rotation therewith. A mask can be provided for rendering the hands individually invisible to the viewer when they are directed away from the scale.

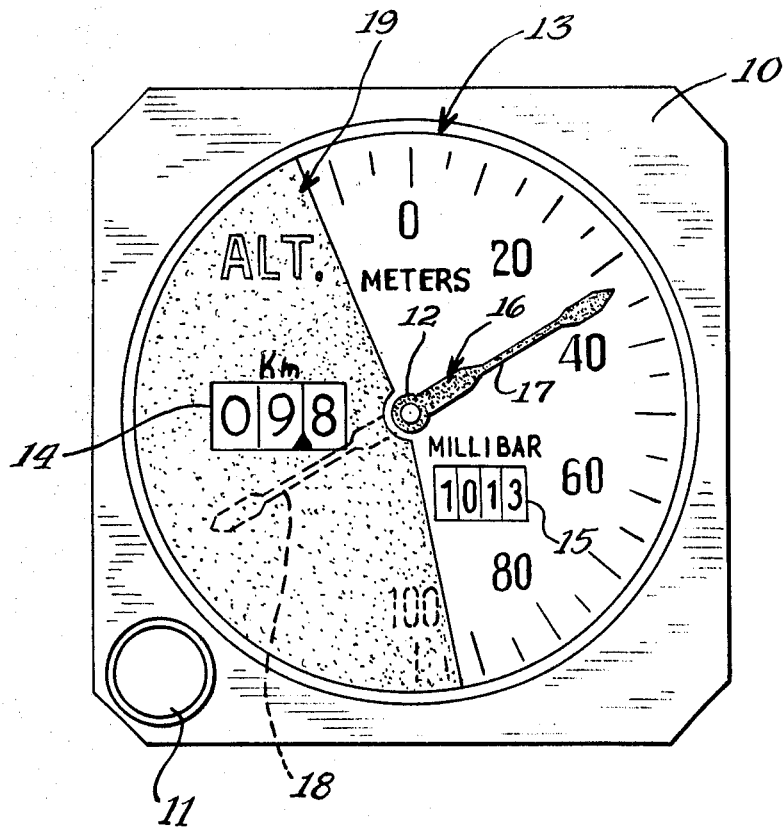

SENSITIVE METRIC ALTIMETER

BACKGROUND OF THE INVENTION

The present invention relates to altimeters and more particularly to a novel display dial arrangement, scaled in the metric system, for association with altimeters having mechanical drives that have long been used for driving the pointer on altimeter dials scaled in the English measuring system.

The metric system is used in Europe, Africa, South America and Asia. Only the United States and Canada measure altitude in terms of feet at the present time.

The currently used sensitive metric altimeters measure from sea level to 1,000 meters only and utilize a second coarse altimeter of higher altitude ranges for example, −1,000 to 10,000 or 20,000 meters. Current sensitive English system altimeters, however, due to precision drive systems of proven reliability, are capable of accurately indicating from, for example, −1,000 feet to 50,000 or 60,000 feet. One such altimeter is shown, for example, in U.S. Pat. No. 2,689,480, the disclosure of which to the extend not inconsistent herewith is specifically incorporated herein by this reference.

There is an increasing requirement that aircraft have altimeter presentation both in the English system (feet) and in the metric system (meters or kilometers).

A problem has been encountered in satisfying this requirement which arises from the fact that in conventional English system altimeter display, the large indicator pointer makes one revolution for a change in altitude of 1,000 feet. This corresponds to a known sensitivity in terms of altitude versus pointer rotation resulting in sufficient accurate reading ability on a standard 3 inch dial. Furthermore, an experience pilot inherently feels the rate of climb or descent by observation of the rate of angular swing of the larger pointer. When the pilot is forced to switch to a conventional metric altimeter (for example, upon landing in a European country), his ability to feel the rate of altitude variation is lost.

A further problem is that the dial presentations of existing altimeters of both systems are quite similar, resulting in confusion and possible misreadings.

SUMMARY OF THE INVENTION

In accordance with the present invention, a readout display arrangement is provided for indicating altitude in metric units, the display arrangement providing a sensitivity in terms of altitude versus pointer rotation that is compatible with the sensitivity of conventional English unit altimeters.

The display arrangement of the present invention is useable directly with conventional drives utilized in English system altimeters of that the advantages offered by such drives can be attained in a metric altimeter, the display driving arrangement requiring only minor modification or replacement of parts of the basic elements are used on the mechanism of the English system altimeter.

In accordance with the present invention, a readout display arrangement for use with conventional English unit altimeters having drive mechanism operable to rotate an output indicator shaft a full revolution for a 1,000-foot variation in altitude is provided which comprises structure providing a digital scale concentric of the indicator shaft and extending 180° radially thereabout. An indicator pointer having a pair of oppositely directed hands is mounted on the shaft for rotation therewith. A mask can be provided for individually rendering the hands invisible to the viewer when directed away from the scale.

Other features and advantages of the invention will be apparent from the following description and claims and are illustrated in the accompanying drawings which show structure embodying preferred features of the present invention and the principles thereof, and what is now considered to be that best mode in which to apply these principles.

BRIEF DESCRIPTION OF THE DRAWING

In the accompanying drawing forming a part of the specification, there is shown a front elevational view of a preferred embodiment of the readout display arrangement of the present invention.

DETAILED DESCRIPTION

Referring now to the drawing, the display utilizes a dial presentation for indicating the two lower order digits and includes a digital readout 14 for the three higher order digits, the digital readout being connected by suitable gearing to a conventional Counter Pointer altimeter mechanism; it being under stood that such modification increases the needle sensitivity of a current (foot) altimeter by 33⅓ percent, but does not affect the reliability of the basic altimeter drive. The conventional altimeter mechanism to which the display system of this invention is applied is shown as including a housing 10, a conventional adjustment knob 11 and a pointer shaft 12. The digital readout 14 is also conventional and is actuated from the altimeter mechanism in the usual fashion. The barometric readout 15 is controlled by the know 11 in the usual way.

The essential feature of the invention resides in the use of a dial type display 13 having a double-ended pointer 16 associated with a 360° field which is comprised of a 100-meter scale spanning 180° thereof. The 100-meter scale is related to the 360° field in accordance with the number of hands on the pointer. Thus, 360° divided by two (number of pointer hands) equals 180°. In the preferred embodiment illustrated herein, a pointer made 19 spans approximately the remainder of the field. Under typical operating conditions, and assuming an aircraft is climbing, one pointer arm is normally hidden by the mask 19 while the other arm is providing the desired scale indication representative of instantaneous altitude. The ascent of the aircraft is accompanied by a clockwise sweep of the pointer 16 so that the indicating hand 17 or 18 respectively sweeps across the scale and approaches the edge of the mask 19 associated with the maximum scale reading. Before the indicating hand disappears, assuming continued climbing movement, the previously shielded hand emerges and the viewer readily transposes the visual cue from one hand to the other.

In the preferred arrangement, the scale is et so that a 100-meter meter span occupies a 180° field and a slight overlap is provided on the top of the scale in the amount of 10 to 15 meters of scale width, so that the point of transition os characterized by a brief interval of both hands 17, 18 being visible and being associated with indentical scale readings spaced 180° apart. Accordingly, the mask is shown slightly less than 180°.

To illustrate that the sensitivity of the pointer movement is roughly 33⅓ percent greater than that of the English system altimeter, it can be seen that one shaft rotation for the English altimeter produces a 1,000-foot range of pointer movement, and that for the metric altimeter, one complete shaft rotation produces 200 meter range of pointer movement or about 656 feet. The subdivision of the field into a 180° scale for 100 meters and the use of a double-ended pointer 16 and an approximately 180° mask 19 allows the basic English system altimeter drive to be used with some calibration changes and/or gear ratio changes for the pointer shaft and for the digital readout 14 of the three higher order digits. The pointer movement sensitivity of the metric display is approximately 33½ percent greater than that of the English display which is a very desirable feature of the novel indicator.

It will be appreciated that the provision of a 180° scale display insures that no confusion will result by placing an altimeter incorporating the display arrangement of the present invention alongside a conventional English system altimeter.

I claim:

1. A readout display arrangement for altimeters having a rotatable output indicator shaft, said display arrangement comprising a circular scale mounted concentric of said shaft and providing a scaled digital presentation radially extending approximately 195° about said shaft, a generally pie-shaped mask of opaque material mounted in parallel spaced relationship with said scale, said mask having a pair of linear edges radially extending from said shaft and defining an approximately 165° included angle therebetween, and an indicator pointer mounted on said shaft for rotation therewith between said scale and said mask, said pointer having a pair of oppositely directed hands, said mask being disposed relative to said scale so as to individually cover said hands, when directed away from said digital presentation.

2. A readout display arrangement in accordance with claim 1 wherein said scaled digital presentation provides a 100-meter per 180° rotation of said pointer.

3. A readout display for altimeters having a rotatable output indicator shaft, said display comprising an indicator pointer mounted on said shaft and having a number of symmetrically spaced hands projecting radially from said shaft to rotate therewith throughout a region the occupies a full 360° angle about said shaft, means providing a digital scale concentric of said shaft and occupying an angular span of said region equal to 360° divided by said number, and masking means occupying slightly less then the remainder of said region for individually masking any hand when the same is substantially beyond the limits of said scale while allowing simultaneous presence of two of said hands when the same are at opposite extremes of said scale.

4. A readout display as defined in claim 3 wherein said number is two.

5. A readout display as defined in claim 3 wherein said digital scale spans a 100-meter range.

6. A readout display as defined in claim 3 wherein said number of hands is two and said digital scale provides a linear 100-meter range spanning a 180° angle.

UNITED STATES PATENT OFFICE
CERTIFICATE OF CORRECTION

Patent No. 3,587,518      Dated June 28, 1971

Inventor(s)     FREDERIC HAUPTMAN

It is certified that error appears in the above-identified patent and that said Letters Patent are hereby corrected as shown below:

Col. 1, line 28:    "display" should be --displays--;
        line 32:    "experience" should be --experienced--;
Col. 2, line 19:    "know" should be --knob--;
        line 40:    "et" should be --set--;
        line 43:    "os" should be --is--;
Col. 3, line 10:    (Claim 2) After "meter" should be --range--.

Signed and sealed this 28th day of December 1971.

(SEAL)
Attest:

EDWARD M. FLETCHER, JR.           ROBERT GOTTSCHALK
Attesting Officer                 Acting Commissioner of Patents